(12) United States Patent
Arai (10) Patent No.: US 10,953,761 B2
(45) Date of Patent: Mar. 23, 2021

(54) CONNECTOR

(71) Applicant: Toyota Jidosha Kabushiki Kaisha, Toyota (JP)

(72) Inventor: Kunihiko Arai, Owariasahi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 16/405,182

(22) Filed: May 7, 2019

(65) Prior Publication Data

US 2019/0344674 A1 Nov. 14, 2019

(30) Foreign Application Priority Data

May 9, 2018 (JP) .............................. JP2018-090480

(51) Int. Cl.
*B60L 53/16* (2019.01)
*B60L 53/302* (2019.01)

(52) U.S. Cl.
CPC ............. *B60L 53/16* (2019.02); *B60L 53/302* (2019.02)

(58) Field of Classification Search
CPC ...................................................... B60L 53/16
USPC ........................................................ 320/104
See application file for complete search history.

(56) References Cited

U.S. PATENT DOCUMENTS

2003/0082945 A1 5/2003 Belady et al.

FOREIGN PATENT DOCUMENTS

| JP | H3117891 A | 5/1991 |
|----|----|----|
| JP | H10-261534 A | 9/1998 |
| JP | 2003-157927 A | 5/2003 |
| JP | 2011-258771 A1 | 12/2011 |
| JP | 2017-507640 A | 3/2017 |
| WO | 2015119791 A1 | 8/2015 |
| WO | 2017137826 A1 | 8/2017 |

*Primary Examiner* — Jerry D Robbins
(74) *Attorney, Agent, or Firm* — Dinsmore & Shohl LLP (57) ABSTRACT

A connector includes: a terminal including a base portion and a cylindrical portion, an outer circumferential surface thereof contacting a counterpart terminal; and a heat transfer member which contacts an inner circumferential surface of the cylindrical portion, absorbs a portion of heat generated at the cylindrical portion, and transports the absorbed heat to a base portion side. The heat transfer member is configured to satisfy Q1>Q2, where Q1 is defined as a heat transfer amount transported to the base portion side during conduction, using the heat transfer member, and Q2 is defined as a heat transfer amount transported to the base portion side during the conduction, using another heat transfer member constituted of a member having a heat conductivity identical to that of the cylindrical portion, when the other one is arranged to fill a space formed on an inner circumferential surface side of the cylindrical portion.

6 Claims, 4 Drawing Sheets

CONNECTOR

CROSS REFERENCE TO RELATED APPLICATIONS

This nonprovisional application claims priority to Japanese Patent Application No. 2018-090480 filed on May 9, 2018 with the Japan Patent Office, the entire contents of which are hereby incorporated by reference.

BACKGROUND

Field

The present disclosure relates to a connector.

Description of the Background Art

A connector is used, for example, to establish electrical connection between a vehicle-mounted battery and a charger provided outside a vehicle (see Japanese National Patent Publication No. 2017-507640). The vehicle includes a connector called an inlet, and the inlet is electrically connected to the vehicle-mounted battery via an electric wire. The charger includes a cable, and a connector called a charging connector is provided at a tip of the cable. With these connectors being connected, the charger charges the vehicle-mounted battery.

SUMMARY

As disclosed in Japanese National Patent Publication No. 2017-507640, a terminal of each connector generally includes a base portion connected to an electric wire, and a body portion provided at a position opposite to the electric wire with respect to the base portion. The body portion has a rod-like shape, for example. When the body portion contacts a terminal of a counterpart connector (counterpart terminal), conduction is established between the terminals. During conduction, the terminal is likely to generate heat at the body portion which contacts the counterpart terminal.

The heat generated at the body portion is transferred from the body portion to the base portion, and is dissipated to the electric wire and the like via the base portion. In each connector disclosed in Japanese National Patent Publication No. 2017-507640, the body portion of the terminal is constituted of a single circular columnar member to be solid, and the terminal is constituted of only a member having an identical heat conductivity as a whole. The heat generated during conduction between the terminals is transported to a base portion side (heat conduction) using only the body portion of the terminal as a medium, and there is room for improvement in terms of more efficiently transporting the heat generated at the body portion of the terminal to the base portion side.

An object of the present disclosure is to provide a connector having a configuration capable of efficiently transporting heat generated at a terminal during conduction to a base portion side.

A connector based on the present disclosure is a connector to be connected to a counterpart connector, including: a terminal including a base portion connected to an electric wire and a cylindrical portion provided at a position opposite to the electric wire with respect to the base portion and extending away from the base portion, an outer circumferential surface of the cylindrical portion contacting a counterpart terminal of the counterpart connector when the connector is connected to the counterpart connector; and a heat transfer member which is provided to contact an inner circumferential surface of the cylindrical portion, absorbs a portion of heat generated at the cylindrical portion during conduction between the terminal and the counterpart terminal from the cylindrical portion, and transports the absorbed heat to a base portion side, the heat transfer member being configured to satisfy $Q1>Q2$, where $Q1$ is defined as a heat transfer amount transported to the base portion side during the conduction, using the heat transfer member as a medium, and $Q2$ is defined as a heat transfer amount transported to the base portion side during the conduction using another heat transfer member constituted of a member having a heat conductivity identical to that of the cylindrical portion as a medium, when the other heat transfer member is arranged to fill a space formed on an inner circumferential surface side of the cylindrical portion.

With the above configuration, the heat transfer member is a member different from a member constituting the cylindrical portion of the terminal, and the heat transfer member absorbs a portion of the heat generated at the cylindrical portion during conduction between the terminal and the counterpart terminal, from the cylindrical portion, and transports the absorbed heat to the base portion side. Since the heat transfer member is configured to satisfy the relation of $Q1>Q2$, the heat transfer member can absorb the heat generated at the cylindrical portion of the terminal and efficiently transport the absorbed heat to the base portion. Accordingly, an increase in the temperature of a heat generation point in the terminal can be effectively suppressed.

In the above connector, both a part of the cylindrical portion located on the base portion side and a part of the cylindrical portion located opposite to the base portion side may be closed, and an enclosed space may be formed on the inner circumferential surface side of the cylindrical portion, the heat transfer member may be a refrigerant sealed in the enclosed space, and the enclosed space and the refrigerant may constitute a heat pipe.

Although the heat transfer member may be constituted of only a metal member having a heat conductivity higher than that of the cylindrical portion, the refrigerant can transport the heat efficiently with the above configuration, when compared with such a case.

In the above connector, the refrigerant may include a gas-liquid two-phase refrigerant, and an evaporation portion where the refrigerant evaporates and a condensation portion where the refrigerant condenses may be formed in the enclosed space, and the heat may be transported according to a phase change of the refrigerant.

With the above configuration, the heat can be moved according to the phase change of the refrigerant, even when the heat pipe does not include a motive power source such as a pump for circulating the refrigerant.

In the above connector, a first flowing portion which allows the refrigerant to flow from the evaporation portion to the condensation portion, and a second flowing portion which allows the refrigerant to flow from the condensation portion to the evaporation portion without flowing through the first flowing portion may be formed in the enclosed space.

The above configuration can achieve high-speed circulation of the refrigerant, when compared with that in a so-called single pipe-type heat pipe, and call further effectively suppress an increase in the temperature of the heat generation point in the terminal.

In the above connector, a part of the terminal constituting the cylindrical portion and a part of the terminal constituting the base portion may be members separate from each other, and may be integrated by being joined to each other.

With the above configuration, a member constituting the cylindrical portion can be fabricated easily according to the specifications of the terminal, independently of a member constituting the base portion.

The connector may further include a cooling device which cools the base portion by an air cooling method or a liquid cooling method.

With the above configuration, heat dissipation efficiency achieved by the heat transfer member can be implied, and thus an increase in the temperature of the terminal and peripheral elements thereof can be further effectively suppressed.

The foregoing and other objects, features, aspects and advantages of the present disclosure will become more apparent from the following detailed description of the present disclosure when taken in conjunction with the accompanying drawings.

DETAILED DESCRIPTION

Hereinafter, first to fifth embodiments will be described with reference to the drawings. In the following description, identical or corresponding parts will be designated by the same reference numerals, and redundant description may not be repeated. As described in detail below, in the first to fourth embodiments (FIGS. 1 to 7), an inlet provided on the vehicle side corresponds to a "connector", and in the fifth embodiment (FIG. 8, FIG. 9), a charging connector provided outside a vehicle corresponds to a "connector".

[First Embodiment]
(Vehicle 1)

Figure 1:
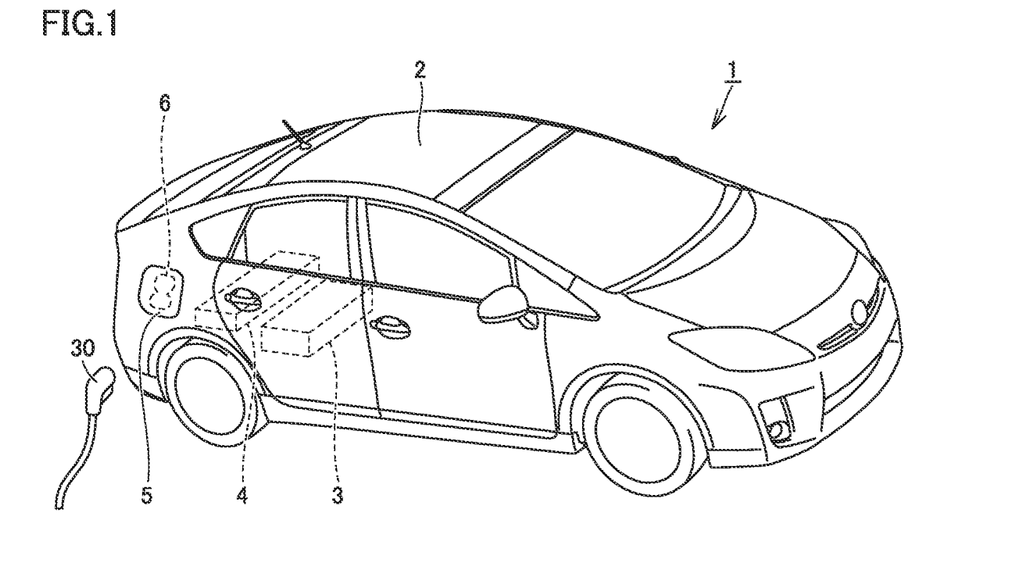
FIG. 1 is a perspective view showing a vehicle f n a first embodiment.

As shown in FIG. 1, a vehicle 1 includes a body 2, a fuel tank 3, a vehicle-mounted battery 4, a cover 5, and an inlet 6. Fuel tank 3 and vehicle-mounted battery 4 are mounted in body 2. Cover 5 is provided in a side surface of body 2. An opening is formed in body 2, and cover 5 opens and closes the opening. Inlet 6 is exposed when cover 5 is opened, charging is performed on vehicle-mounted battery 4, with a charging connector 30 being connected to inlet 6.

(Inlet 6)

Figure 2:
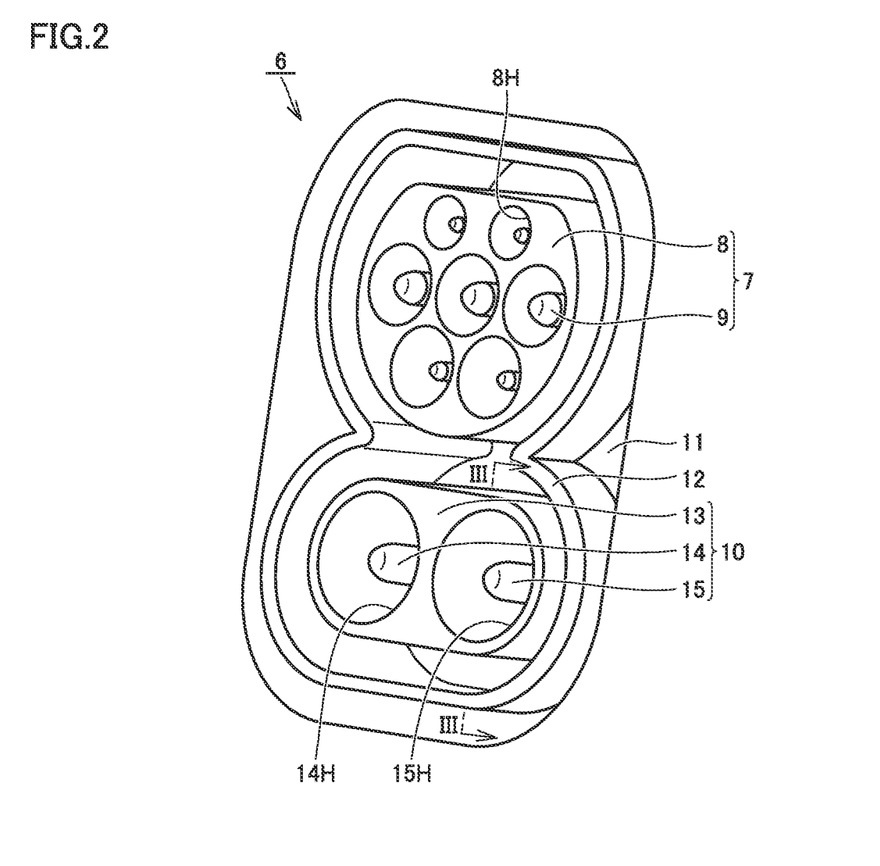
FIG. 2 is a perspective view showing an inlet 6 in the first embodiment.

FIG. 2 is a perspective view showing inlet 6. Inlet 6 includes a base plate 11, a guide wall 12, a first connection portion 7, and a second connection portion 10. Base plate 11 has a plate-like shape. Guide wall 12 has an annular shape, and rises from base plate 11 toward the outside of the vehicle. First connection portion 7 and second connection portion 10 are arranged, inside guide wall 12.

First connection portion 7 has a columnar portion 8 and a plurality of terminals 9. A plurality of terminal holes 8H are formed in columnar portion 8. The plurality of terminals 9 are arranged inside the plurality of terminal holes 8H, respectively. Each of the plurality of terminals 9 functions as a terminal used to supply electric power, a terminal used to transmit and receive a signal, or a ground terminal, for example. Normal charging is performed on vehicle-mounted battery 4 (FIG. 1), with a charging connector not shown being connected to first connection portion 7. Normal charging is charging from a common commercial power source, such as a power source of 100 V or 200 V, for example.

Second connection portion 10 has a columnar portion 13 and a pair of terminals 14, 15. A pair of terminal holes 14H, 15H is formed in columnar portion 13. Terminals 14, 15 are arranged inside terminal holes 14H, 15H, respectively. Terminals 14, 15 are used to supply electric power for fast charging, for example. Fast charging is performed on vehicle-mounted battery 4 (FIG. 1), with charging connector 30 (FIG. 1) being connected to first connection portion 7 and second connection portion 10 of inlet 6. Fast charging is charging in which electric power of 20 kW, 50 kW, 120 kW, or more is supplied, for example, (Charging Connector 30 and Counterpart Terminal 35)

Figure 3:
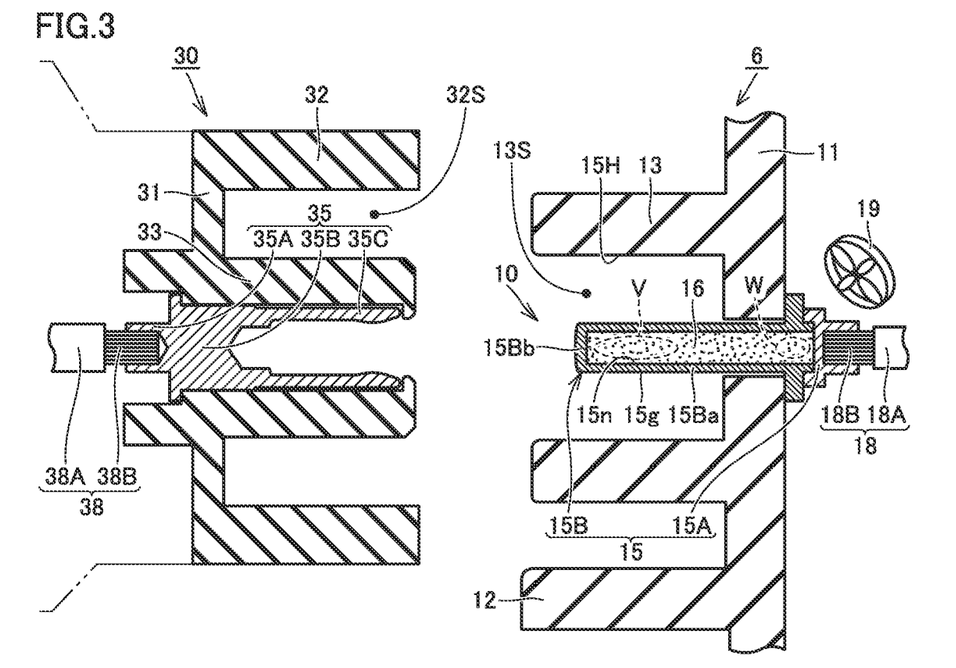
FIG. 3 is a cross sectional view taken along a line in FIG. 2 and viewed in a direction indicated by arrows.
Figure 4:
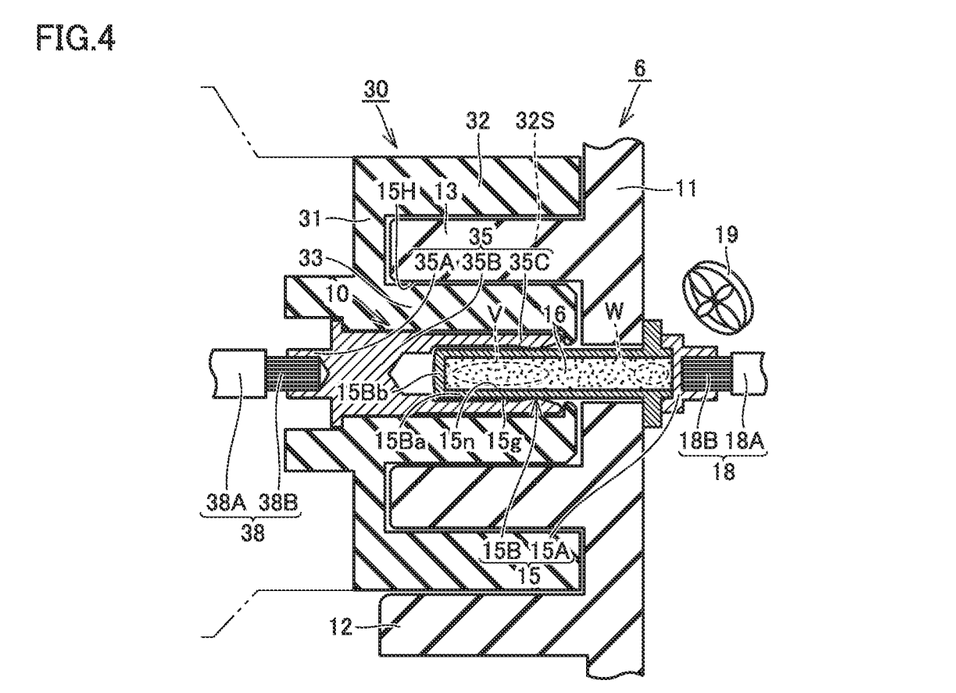
FIG. 4 is a cross sectional view showing a manner in which a charging connector 30 is fitted into inlet 6 in the first embodiment.

FIG. 3 is a cross sectional view taken along a line III-III in FIG. 2 and viewed in a direction indicated by arrows, which also shows a sectional shape of charging connector 30, in addition to a sectional shape of inlet 6 for convenience of description. FIG. 4 is a cross sectional view showing a manner in which charging connector 30 is fitted into inlet 6.

As shown in FIGS. 3 and 4, charging connector 30 serving as a counterpart connector has a bottom portion 31, an outer annular portion 32, an inner annular portion 33, and a counterpart terminal 35. Bottom portion 31, outer annular portion 32, and inner annular portion 33 can be formed integrally by resin molding. Outer annular portion 32 is formed to have a cylindrical shape, and rises from bottom portion 31.

Inner annular portion 33 is provided to rise from bottom portion 31, and is formed to have a cylindrical shape to receive terminal 15 of inlet 6 inside thereof. Inner annular portion 33 is located inside outer annular portion 32, and a recessed portion 32S is formed between outer annular portion 32 and inner annular portion 33. Columnar portion 13 of inlet 6 is fitted into recessed portion 32S (FIG. 4).

Counterpart terminal 35 has a base portion 35A, a central portion 35B, and a plurality of contact strips 35C. Counterpart terminal 35 is electrically connected to a charger not shown, via an electric wire 38. A conductor 38B is exposed from a sheath 38A of electric wire 38, and base portion 35A of counterpart terminal 35 is connected to conductor 38B such as by a press fit. The plurality of contact strips 35C are provided at a position opposite to base portion 35A with respect to central portion 35B.

The plurality of contact strips 35C are arranged inside inner annular portion 33. The plurality of contact strips 35C are each formed as a long plate, and extend along an axial direction of inner annular portion 33. The plurality of contact strips 35C have a spacing therebetween, and are arranged side by side along a circumferential direction. Terminal 15 of inlet 6 is inserted into a space surrounded by the plurality of contact strips 35C (FIG. 4). Mechanical mutual contact between counterpart terminal 35 (the plurality of contact strips 35C) and terminal 15 is maintained by inner annular portion 33.

(Terminal 15 of Inlet 6)

Terminal 15 of inlet 6 is provided inside columnar portion 13 (terminal hole 15H) (see FIG. 1, FIG. 3). A recessed portion 13S is formed between terminal 15 and columnar portion 13. Inner annular portion 33 of charging connector 30 is fitted into recessed portion 13S (FIG. 4). Terminal 15 has a substantially rod-like outer shape as a whole. Terminal 15 has a diameter of 8 mm to 10 mm, for example. Terminal 15 penetrates base plate 11, and extends along an axial direction of terminal hole 15H. Terminal 15 is electrically connected to vehicle-mounted battery 4 (FIG. 1) via an electric wire 18.

Terminal 15 includes a base portion 15A and a body portion 15B. Base portion 15A of terminal 15 is made of a metal such as copper. A conductor 18B is exposed from a sheath 18A of electric wire 18, and base portion 15A of terminal 15 is connected to conductor 18B such as by a press fit. Body portion 15B is provided at a position opposite to electric wire 18 with respect to base portion 15A.

Body portion 15B of terminal 15 is also made of a metal such as copper. Body portion 15B includes a cylindrical portion 15Ba and a tip portion 15Bb. Cylindrical portion 15Ba has an inner circumferential surface 15n and an outer circumferential surface 15g. Cylindrical portion 15Ba extends away from base portion 15A along the axial direction of terminal hole 15H.

A part of cylindrical portion 15Ba located on the base portion 15A side (right side in FIG. 3) is closed by joining base portion 15A to cylindrical portion 15Ba. In the present embodiment, a part of terminal 15 constituting cylindrical portion 15Ba (that is, body portion 15B) and a part of terminal 15 constituting base portion 15A are members separate from each other, and are, integrated by being joined to each other. Cylindrical portion 15Ba is electrically connected to electric, wire 18 via base portion 15A. A part of cylindrical portion 15Ba located opposite to the base portion 15A side is closed by tip portion 15Bb. An enclosed space is formed on the inner circumferential surface 15n side of cylindrical portion 15Ba.

The above configuration of base portion 15A and body portion 15B (cylindrical portion 15Ba and tip portion 15Bb) of terminal 15 is an example. In body portion 15B, cylindrical portion 15Ba and tip portion 15Bb may be formed integrally from a single member as shown in FIG. 3, or body portion 15B may be formed by joining a plurality of (for example, three or more) members to one another. Cylindrical portion 15Ba can have any shape, such as a circular cylindrical shape, an elliptic cylindrical shape, or a polygonal cylindrical shape (for example, a rectangular cylindrical shape). As long as a heat transfer member 16 described later can be provided on the inner circumferential surface 15n side of cylindrical portion 15Ba, cylindrical portion 15Ba may have a flat shape, and cylindrical portion 15Ba may have a rectangular parallelepiped-like outer shape or a thin plate-like outer shape. A portion of cylindrical portion 15Ba may be curved or bent to match the shape of counterpart terminal 35.

When charging connector 30 and inlet 6 are connected with each other (FIG. 4), outer circumferential surface 15g of cylindrical portion 15Ba of terminal 15 contacts contact strips 35C of counterpart terminal 35. The plurality of contact strips 35C are located between inner annular portion 33 and outer circumferential surface 15g of cylindrical portion 15Ba of terminal 15. Terminal 15 is electrically connected to counterpart terminal 35 when outer circumferential surface 15g contacts at least one contact strip 35C.

(Heat Transfer Member 16)

Inlet 6 further includes heat transfer member 16. Heat transfer member 16 is provided to contact inner circumferential surface 15n of cylindrical portion 15Ba of terminal 15, and performs heat exchange with cylindrical portion 15Ba. When conduction is established between counterpart terminal 35 and terminal 15 heat is generated at cylindrical portion 15Ba. Heat transfer member 16 absorbs a portion of the heat generated at cylindrical portion 15Ba during conduction, from cylindrical portion 15Ba, and transports the absorbed heat to the base portion 15A side.

Heat transfer member 16 is configured to satisfy the relation of Q1>Q2 when Q1 and Q2 are defined as described below. Q1 is a heat transfer amount (unit: for example, J/s) transported to the base portion 15A side when conduction is performed under predetermined conditions (for example, when conduction is performed between counterpart terminal 35 and terminal 15 under predetermined charging conditions), using heat transfer member 16 as a medium.

On the other hand, another heat transfer member is prepared instead of heat transfer member 16. The other heat transfer member is constituted of a solid material having a heat conductivity identical to that of a member constituting cylindrical portion 15Ba, and filling a space formed on the inner circumferential surface 15n side of cylindrical portion 15Ba. Typically, a member having a material identical to that for cylindrical portion 15Ba, and filling the space formed on the inner circumferential surface 15n side of cylindrical portion 15Ba is prepared as the other heat transfer member. Q2 is a heat transfer amount (unit: for example, J/s) transported to the base portion 15A side, using the other heat transfer member as described above as a medium, when the other heat transfer member is arranged to fill the space formed on the inner circumferential surface 15n side of cylindrical portion 15Ba and conduction is performed under conditions identical to those for Q1.

Any configuration can be adopted as heat transfer member 16, as long as heat transfer member 16 satisfies Q1>Q2. Although it is difficult to accurately calculate the values of Q1 and Q2, the magnitude relation between Q1 and Q2 can be easily determined. That is, the values of Q1 and Q2 may be influenced by the temperature and the pressure of an atmosphere in which terminal 15 and the like are arranged, the state of heat transfer member 16 (a solid, a liquid, a gas), and the mechanism of heat transfer (such as heat transmission, heat conduction, convection).

Whether or not heat transfer member 16 satisfies Q1>Q2 can be easily determined by experiment. For example, a change in the temperature of base portion 15A when charging is performed using heat transfer member 16 under predetermined charging conditions, and a change in the temperature of base portion 15A when charging is performed using the other heat transfer member described above under charging conditions identical to the predetermined conditions are measured. The change in the temperature of base portion 15A can be easily measured by attaching a temperature sensor, such as a thermistor, to base portion 15A. When the degree of increase in the temperature of base portion 15A (the relation between the temperature and the time elapsed after the start of conduction) in the case of using heat transfer member 16 is sharper than the degree of increase in the temperature of base portion 15A in the case of using the other heat transfer member, it can be determined that heat transfer member 16 satisfies Q1>Q2.

As described above, in the present embodiment, an enclosed space is formed on the inner circumferential surface 15n side of cylindrical portion 15Ba of terminal 15. Heat transfer member 16 is a refrigerant sealed in the enclosed space. The enclosed space formed on the inner circumferential surface 15n side of cylindrical portion 15Ba and heat transfer member 16 (refrigerant) constitute a heat pipe. Generally, a heat pipe has a heat transfer amount sufficiently larger than that in the case of heat conduction through a solid material.

The refrigerant serving as heat transfer member 16 includes a gas-liquid two-phase refrigerant. An evaporation portion V where the refrigerant evaporates and a condensation portion W where the refrigerant condenses are formed in the enclosed space formed on the inner circumferential surface 15n side of cylindrical portion 15Ba, and the heat is transported according to a phase change of the refrigerant. In some embodiments, the inner circumferential surface 15n of cylindrical portion 15Ba is provided with a member or processing for efficiently moving the refrigerant by the action of a capillary phenomenon, such as a mesh or groove-like wick. The heat transported to the base portion 15A side within the enclosed space by heat transfer member 16 (refrigerant) is dissipated to conductor 18B of electric wire 18 via base portion 15A.

(Function and Effect)

It is assumed that a configuration as in the first embodiment is not adopted, and for example, body portion 15B of terminal 15 is constituted of a single circular columnar member (not a hollow member but a solid member), and terminal 15 is constituted of only a member having an identical heat conductivity as a whole, in such a case, the heat generated during conduction between terminal 15 and counterpart terminal 35 is transported to the base portion 15A side, using only body portion 15B terminal 15 as a medium. In such a configuration, the heat is less likely to be transferred from a heat generation point to base portion 15A than that in the first embodiment, and a heat dissipation effect acting on the heat generation point is also less than that in the first embodiment.

In contrast, in the first embodiment, heat transfer member 16 is provided to contact inner circumferential surface 15n of body portion 15B. Heat transfer member 16 is a member different from the member constituting cylindrical portion 15Ba of terminal 15, and heat transfer member 16 absorbs a portion of the heat generated at cylindrical portion 15Ba during conduction between terminal 15 and counterpart terminal 35, from cylindrical portion 15Ba, and transports the absorbed heat to the base portion 15A side. Since heat transfer member 16 is configured to satisfy the relation of Q1>Q2 when transporting, the heat as described above, heat transfer member 16 can absorb the heat generated at cylindrical portion 15Ba of terminal 15 and efficiently transport the absorbed heat to base portion 15A, when compared with the case assumed as described above. Accordingly, an increase in the temperature of a heat generation point in terminal 15 can be effectively suppressed.

Body portion 15B of terminal 15 is arranged to contact (in other words, to be thermally connected to) electric wire 18 (here, conductor 18B) via base portion 15A. Electric wire 18 has a heat capacity sufficiently larger than that of terminal 15, and can appropriately perform heat exchange with base portion 15A. Base portion 15A may be arranged to contact conductor 18B of electric wire 18 and also a part different from conductor 18B, and may be configured to also perform heat exchange with the different part.

As shown in FIGS. 3 and 4, inlet 6 may further include a cooling device 19, for example. Cooling device 19 cools base portion 15A of terminal 15 by an air cooling method or a liquid cooling method. As the air cooling method, a fan can be adopted, for example. A plurality of heat dissipation fins may be provided on a surface of base portion 15A.

As the liquid cooling method, a circuit through which a liquid circulates by being driven by a pump is prepared, and heat exchange is performed between the circuit and base portion 15A. The liquid cooling method can achieve a higher degree of quietness than that in the air cooling method. By adopting these configurations, heat dissipation efficiency achieved by heat transfer member 16 can be improved, and thus an increase in the temperature of terminal 15 and peripheral elements thereof can be further effectively suppressed.

As described above, in the first embodiment, an enclosed space is formed on the inner circumferential surface 15n side of cylindrical portion 15Ba, and heat transfer member 16 is a refrigerant sealed in the enclosed space. The enclosed space and the refrigerant constitute a heat pipe. Although heat transfer member 16 may be constituted of only a metal member having a heat conductivity higher than that of cylindrical portion 15Ba (for example, silver), the refrigerant can transport the heat efficiently, when compared with such a case. By forming the enclosed space for the heat pipe such as by welding, a leak of the refrigerant can be suppressed (when compared with a case where an accommodation space for the refrigerant is formed such as by fitting, for example), and thus occurrence of a short circuit or the like due to a leak of the refrigerant can also be suppressed. In addition, since heat dissipation is performed on cylindrical portion 15Ba by heat transfer member 16 provided within terminal 15, the presence of heat, transfer member 16 does not cause a short circuit between terminals 14 and 15 (FIG. 1), even when terminals 14 and 15 are arranged at positions close to each other.

As described above, in the first embodiment, the refrigerant serving as heat transfer member 16 includes a gas-liquid two-phase refrigerant. In the case of the gas-liquid two-phase refrigerant, the heat can be moved according to the phase change of the refrigerant, even when the heat pipe does not include a motive power source such as a pump for circulating the refrigerant. When the motive power source is not used, it can also be contemplated to downsize the entire device. An appropriate level difference may be provided between evaporation portion V and condensation portion W, according to the type, shape, size and the like of the heat pipe. As the gas-liquid two-phase refrigerant, a refrigerant which vaporizes at normal temperature may be used. Even when a refrigerant leak occurs, occurrence of a short circuit or the like can be suppressed. The refrigerant is not limited to a gas-liquid two-phase refrigerant, and a single-phase liquid refrigerant such as water or an anti-freezing solution may be used.

As described above, in the first embodiment, a part of terminal 15 constituting cylindrical portion 15Ba (that is, body portion 15B) and a part of terminal 15 constituting base portion 15A are members separate from each other, and are integrated by being joined to each other. With such a configuration, the part constituting cylindrical portion 15Ba can be fabricated easily according to the specifications of terminal 15, independently of the part constituting base portion 15A. Terminal 15 is formed by fabricating or selecting body portion 15B which matches the specifications (size, shape, and the like) of terminal 15, and then joining base portion 15A to body portion 15B. In some embodiments, the base portion 15A is formed to be used in common for various specifications of body portion 15B.

A temperature sensor, such as a thermistor may be attached to any position in terminal 15, and charging power and the like may be controlled based on a temperature sensing result. The temperature sensor can be provided, for example, between a part of terminal 15 penetrating base plate 11 and an inner circumferential surface of an opening in base plate 11. Although the above description given with reference to FIGS. 3 and 4 focuses attention on terminal 15 constituting second connection portion 10 (FIG. 2), the same configuration as that of terminal 15 is also applicable to terminal 14 (FIG. 2).

[Second Embodiment]

Figure 5:
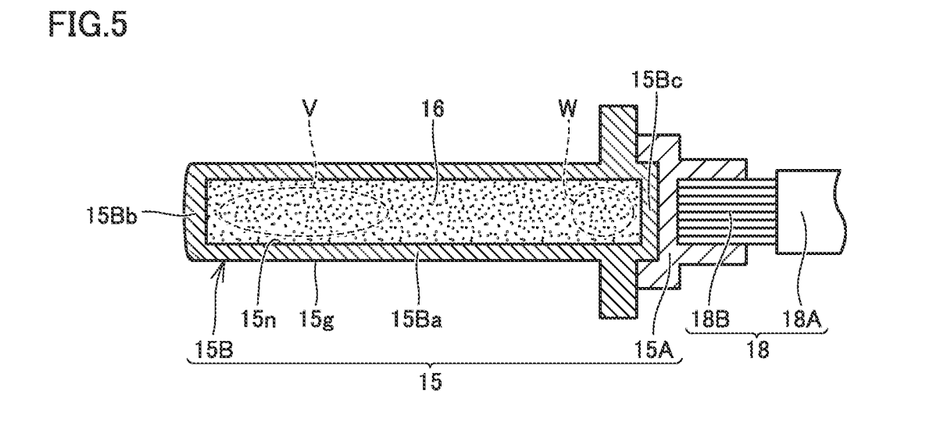
FIG. 5 is a cross sectional view showing a terminal 15 included in an inlet in a second embodiment.

FIG. 5 is a cross sectional view showing terminal 15 included in an inlet in a second embodiment. In terminal 15 in the first embodiment (FIG. 3) described above, a part of cylindrical portion 15Ba on the base portion 15A side is closed by joining base portion 15A to the part.

As shown in FIG. 5, a closing portion 15Bc may be formed on the base portion 15A side of cylindrical portion 15Ba. With such a configuration, body portion 15B can accommodate heat transfer member 16 (refrigerant) on the inner circumferential surface 15n side, even when base portion 15A is not joined to body portion 15B. Terminal 15 can further include a loop-type heat pipe on the base portion 15A side of cylindrical portion 15Ba.

[Third Embodiment]

Figure 6:
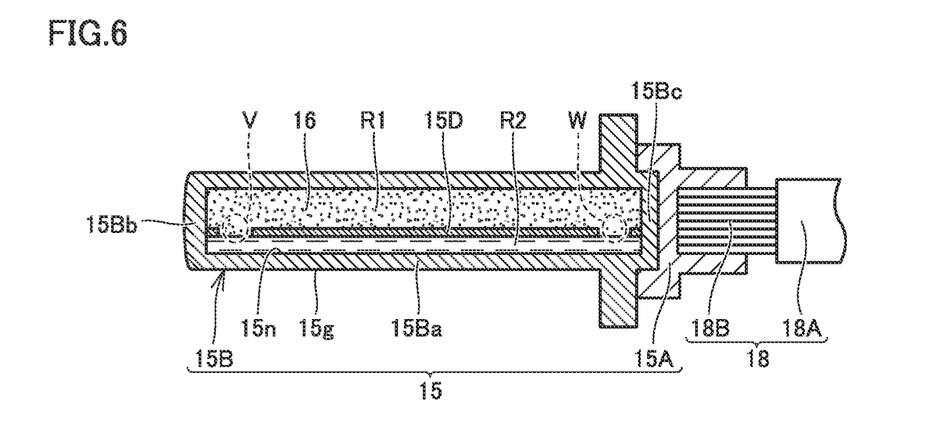
FIG. 6 is a cross sectional view showing terminal 15 included in an inlet in a third embodiment.

FIG. 6 is a cross sectional view showing terminal 15 included in an inlet in a third embodiment. As shown in FIG. 6, a separator 15D having two openings may be provided within body portion 15B of terminal 15. By the presence of separator 15D, a first flowing portion R1 and a second flowing portion R2 are formed in the enclosed space on the inner circumferential surface 15n side of cylindrical portion 15Ba. The two openings provided in separator 15D constitute evaporation portion V and condensation portion W, respectively.

First flowing portion R1 allows the refrigerant to flow from evaporation portion V to condensation portion W. Second flowing portion R2 allows the refrigerant to flow from condensation portion W to evaporation portion V without flowing through first flowing portion R1. In the third embodiment, a loop-type heat pipe is formed within body portion 15B. Such a configuration can achieve high-speed circulation of the refrigerant, when compared with that in a so-called single pipe-type heat pipe, and can further effectively suppress an increase in the temperature of the heat generation point in terminal 15.

[Fourth Embodiment]

Figure 7:
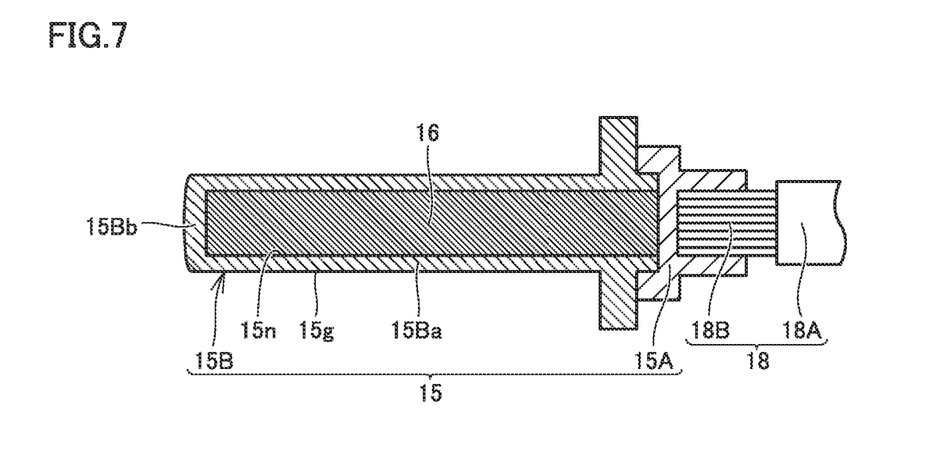
FIG. 7 is a cross sectional view showing terminal 15 included in an inlet in a fourth embodiment.

FIG. 7 is a cross sectional view showing terminal 15 included in an inlet in fourth embodiment. In the fourth embodiment, body portion 15B does not constitute a heat pipe and heat transfer member 16 is constituted of only a metal member. The heat conductivity of heat transfer member 16 is higher than the heat conductivity of cylindrical portion 15Ba. Heat transfer member 16 is made of silver, for example, and cylindrical portion 15Ba is made of copper, for example. With such a configuration, a short circuit due to a refrigerant leak does not occur. Since such a configuration does not require a device for and a step of sealing the refrigerant within body portion 15B, terminal 15 can be fabricated easily and inexpensively.

In the above configuration, heat transfer member 16 may be provided to penetrate tip portion 15Bb of terminal 15 (in other words, the tip side of cylindrical portion 15Ba does not have to be closed). The configuration that tip portion 15B1 closes the tip side of cylindrical portion 15Ba may be adopted as appropriate, if necessary, in the present embodiment.

[Variation for First to Fourth Embodiments]

The first to fourth embodiments described above have been described based on a case where the technical idea of the present disclosure is applied to second connection portion 10 (FIG. 1) for performing fast charging. The technical idea of the present disclosure is also applicable to first connection portion 7 (FIG. 1) for performing normal charging.

When vehicle 1 (FIG. 1) includes an output connector for taking out electric power stored in vehicle-mounted battery 4 to the outside, the technical idea of the present disclosure is also applicable to such an output connector, and in this case, the output connector corresponds to a "connector", and a member to be connected to the output connector corresponds to a "counterpart connector".

[Fifth Embodiment]

Figure 8:
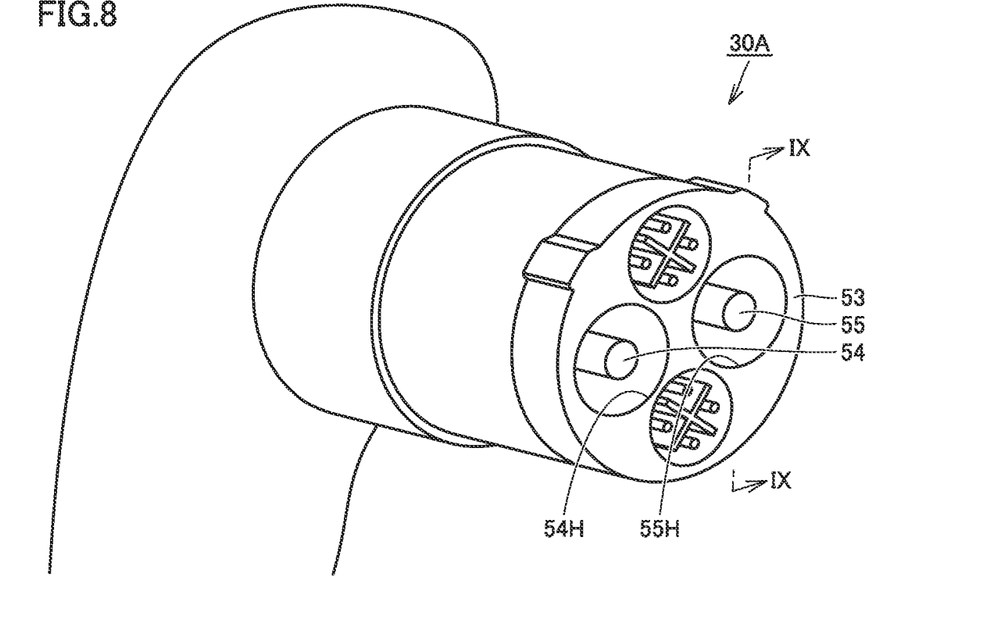
FIG. 8 is a perspective view showing a charging connector 30A in a fifth embodiment.
Figure 9:
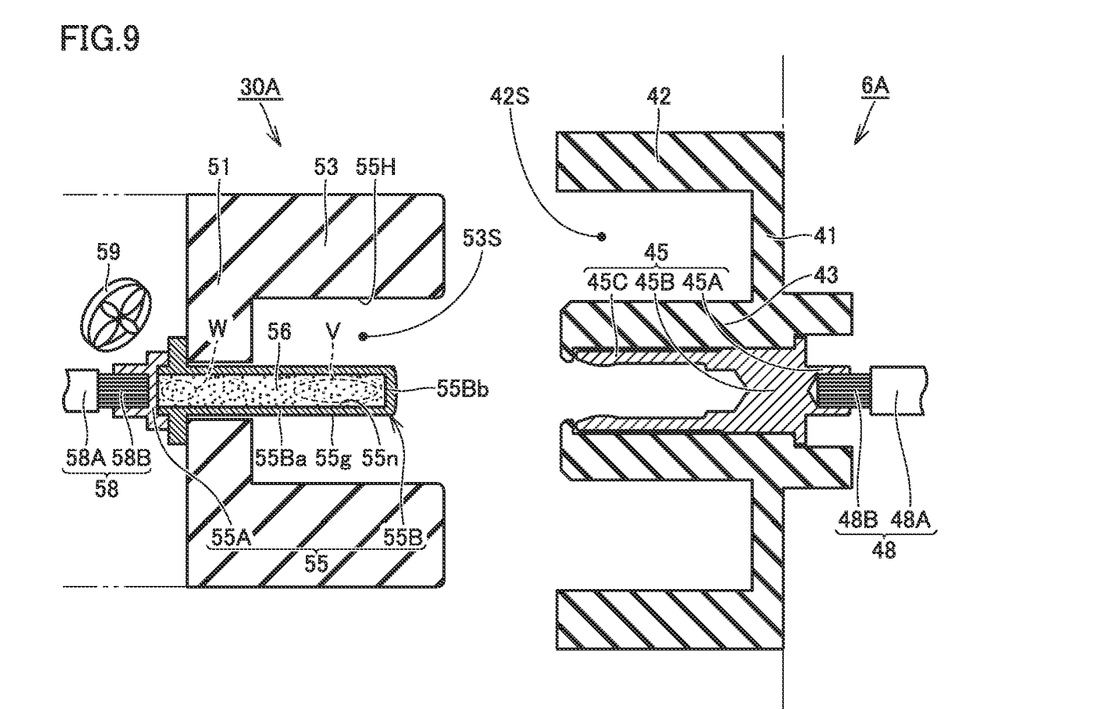
FIG. 9 is a cross sectional view taken along a line IX-IX in FIG. 8 and viewed in a direction indicated by arrows.

FIG. 8 is a perspective view showing a charging connector 30A in a fifth embodiment. FIG. 9 is a cross sectional view taken along a line IX-IX in FIG. 8 and viewed in a direction indicated by arrows, which also shows a sectional shape of an inlet 6A, in addition to a sectional shape of charging connector 30A, for convenience of description. In the fifth embodiment, charging connector 30A corresponds to a "connector". Charging (for example, fast charging) is performed on the vehicle-mounted battery, with charging connector 30A being connected to inlet 6A.

(Inlet 6A and Counterpart Terminal 45)

As shown in FIG. 9, inlet 6A serving as a counterpart connector has a bottom portion 41, an outer annular portion 42, an inner annular portion 43, and a counterpart terminal 45. Bottom portion 41, outer annular portion 42, and inner annular portion 43 can be formed integrally by resin molding. Outer annular portion 42 is formed to have a cylindrical shape, and rises from bottom portion 41.

Inner annular portion 43 is provided to rise from bottom portion 41, and is formed to have a cylindrical shape to receive a terminal 55 of charging connector 30A inside thereof. Inner annular portion 43 is located inside outer annular portion 42, and a recessed portion 42S is formed between outer annular portion 42 and inner annular portion. A circumferential wall portion 53 of charging connector 30A is fitted into recessed portion 42S.

Counterpart terminal 45 has a base portion 45A, a central portion 45B, and a plurality of contact strips 45C. Counterpart terminal 45 is electrically connected to a vehicle-mounted battery not shown, via an electric wire 48. A conductor 48B is exposed from a sheath 48A of electric wire 48, and base portion 45A of counterpart terminal 45 is connected to conductor 48B such as by a press fit. The plurality of contact strips 45C are provided at a position opposite to base portion 45A with respect to central portion 45B.

The plurality of contact strips 45C are arranged inside inner annular portion 43. The plurality of contact strips 45C are each formed as a long plate, and extend along an axial direction of inner annular portion 43. The plurality of contact strips 45C have a spacing therebetween, and are arranged side by side along a circumferential direction. Terminal 55 of charging connector 30A is inserted into a space surrounded by the plurality of contact strips 45C. Mechanical mutual contact between counterpart terminal 45 (the plurality of contact strips 45C) and terminal 55 is maintained by inner annular portion 43.

(Charging Connector 30A and Terminal 55)

Referring to FIG. 8, charging connector 30A includes a base plate 51 (FIG. 9), circumferential wall portion 53, terminals 54 and 55, and a cooling device 59 (FIG. 9). Base plate 51 has a plate-like shape. Circumferential wall portion 53 rises from base plate 51, and terminal holes 54H and 55H are formed inside circumferential wall portion 53. Terminals 54 and 55 are arranged inside terminal holes 54H and 55H, respectively.

As shown in FIG. 9, a recessed portion 53S is formed between terminal 55 and circumferential wall portion 53. Inner annular portion 43 of inlet 6A is fitted into recessed portion 53S. Terminal 55 has a substantially rod-like outer shape as a whole. Terminal 55 has a diameter of 8 mm to 10 mm, for example. Terminal 55 penetrates base plate 51, and extends along an axial direction of terminal hole 55H. Terminal 55 is electrically connected to a charger not shown, via an electric wire 58.

Terminal 55 includes a base portion 55A and a body portion 55B. Base portion 55A of terminal 55 is made of a metal such as copper. A conductor 58B is exposed front a sheath 58A of electric wire 58, and base portion 55A of terminal 55 is connected to conductor 58B such as by a press fit. Body portion 55B is provided at a position opposite to electric wire 58 with respect to base portion 55A.

Body portion 55B of terminal 55 is also made of a metal such as copper. Beds portion 55B includes a cylindrical portion 55Ba and a tip portion 55Bb. Cylindrical portion 55Ba has an inner circumferential surface 55n and an outer circumferential surface 55g. Cylindrical portion 55Ba extends away from base portion 55A along, the axial direction of terminal hole 55H.

A part of cylindrical portion 55Ba located on the base portion 55A side (left side in FIG. 9) is closed by joining base portion 55A to cylindrical portion 55Ba. In the present embodiment, a part of terminal 55 constituting cylindrical portion 55Ba (that is, body portion 55B) and a part of terminal 55 constituting base portion 55A are members separate from each other, and are integrated by being joined to each other. Cylindrical portion 55Ba is electrically connected to electric wire 58 via base portion 55A. A part of cylindrical portion 55Ba located opposite to the base portion 55A side is closed by tip portion 55Bb. An enclosed space is formed on the inner circumferential surface 55n sick of cylindrical portion 55Ba.

The above configuration of base portion 55A and body portion 55B (cylindrical portion 55Ba and tip portion 55Bb) of terminal 55 is an example. In body portion 55B, cylindrical portion 55Ba and tip portion 55Bb may be formed integrally from a single member as shown in FIG. 9, or body portion 55B may be formed by joining a plurality of (for example, three or more) members to one another. Cylindrical portion 55Ba can have any shape, such as a circular cylindrical shape, an elliptic cylindrical shape, or a polygonal cylindrical shape (for example, a rectangular cylindrical shape). As long as a heat transfer member 56 described later can be provided on the inner circumferential surface 55n side of cylindrical portion 55Ba, cylindrical portion 55Ba may have a flat shape, and cylindrical portion 55Ba may have a rectangular parallelepiped-like outer shape or a thin plate-like outer shape. A portion of cylindrical portion 55Ba may be curved or bent to match the shape of counterpart terminal 45.

When inlet 6A and charging connector 30A are connected with each other, outer circumferential surface 55g of cylindrical portion 55Ba of terminal 55 contacts contact strips 45C of counterpart terminal 45. The plurality of contact strips 45C are located between inner annular portion 43 and outer circumferential surface 55g of cylindrical portion 55Ba of terminal 55. Terminal 55 is electrically connected to counterpart terminal 45 when outer circumferential surface 55g contacts at least one contact strip 45C.

(Heat Transfer Member 56)

Charging connector 30A further includes heat transfer member 56. Heat transfer member 56 is provided to contact inner circumferential surface 55n of cylindrical portion 55Ba of terminal 55, and performs heat exchange with cylindrical portion 55Ba. When conduction is established between counterpart terminal 45 and terminal 55, heat is generated at cylindrical portion 55Ba. Heat transfer member 56 absorbs a portion of the heat generated at cylindrical portion 55Ba during conduction, from cylindrical portion 55Ba, and transports the absorbed heat to the base portion 55A side.

Heat transfer member 56 is configured to satisfy the relation of Q1>Q2 when Q1 and Q2 are defined as described below. Q1 is a heat transfer amount (unit: for example, J/s) transported to the base portion 55A side when conduction is performed, under predetermined conditions (for example, when conduction is performed between counterpart terminal 45 and terminal 55 under predetermined charging conditions), using heat transfer member 56 as a medium.

On the other hand, another heat transfer member is prepared instead of heat transfer member 56. The other heat transfer member is constituted of a solid material having a heat conductivity identical to that of a member constituting cylindrical portion 55Ba, and filling a space formed on the inner circumferential surface 55n side of cylindrical portion 55Ba. Typically, a member having a material identical to that for cylindrical portion 55Ba, and filling the space formed on the inner circumferential surface 55n side of cylindrical portion 55Ba is prepared as the other heat transfer member. Q2 is a heat transfer amount (unit: for example, J/s) transported to the base portion 55A side, using the other heat transfer member as described above as a medium, when the other heat transfer member is arranged to fill the space formed on the inner circumferential surface 55n side of cylindrical portion 55Ba and conduction is performed under conditions identical to those for Q1.

Any configuration can be adopted as heat transfer member 56, as long as heat transfer member 56 satisfies Q1>Q2. Although it is difficult to accurately calculate the values of Q1 and Q2, the magnitude relation between Q1 and Q2 can be easily determined. That is, the values of Q1 and Q2 may be influenced by the temperature of an atmosphere in which terminal 55 and the like are arranged, the state of heat transfer member 56 (a solid, a liquid, a gas), and the mechanism of heat transfer (such as heat transmission, heat conduction, convection).

Whether or not heat transfer member 56 satisfies Q1>Q2 can be easily determined by experiment. For example, a change in the temperature of base portion 55A when charging is performed using heat transfer member 56 under predetermined charging conditions, and a change m the temperature of base portion 55A when charging is performed using the other heat transfer member described above under charging conditions identical to the predetermined conditions are measured. The change in the temperature of base portion 55A can be easily measured by attaching a temperature sensor, such as a thermistor, to base portion 55A. When the degree of increase in the temperature of base portion 55A (the relation between the temperature and the time elapsed after the start of conduction) in the case of using heat transfer member 56 is sharper than the degree of increase in the temperature of base portion 55A in the case of using the other heat transfer member, it can be determined that heat transfer member 56 satisfies Q1>Q2.

As described above, in the present embodiment, an enclosed space is formed on the inner circumferential surface 55*n* side of cylindrical portion 55Ba of terminal 55. Heat transfer member 56 is a refrigerant sealed in the enclosed space. The enclosed space formed on the inner circumferential surface 55*n* side of cylindrical portion 55Ba and heat transfer member 56 (refrigerant) constitute a heat pipe. Generally, a heat pipe has a heat transfer amount sufficiently larger than that in the case of heat conduction through a solid material.

The refrigerant serving as heat transfer member 56 includes a gas-liquid two-phase refrigerant. Evaporation portion V where the refrigerant evaporates and condensation portion W where the refrigerant condenses are formed in the enclosed space formed on the inner circumferential surface 55*n* side of cylindrical portion 55Ba, and the heat is transported according to a phase change of the refrigerant. In some embodiments, the inner circumferential surface 55*n* of cylindrical portion 55Ba is provided with a member or processing for efficiently moving the refrigerant by the action of a capillary phenomenon, such as a mesh or groove-like wick. The heat transported to the base portion 55A side within the enclosed space by heat transfer member 56 (refrigerant) is dissipated to conductor 58E of electric wire 58 via base portion 55A, (Function and Effect)

Its assumed that a configuration as in the fifth embodiment is not adopted, and for example, body portion 55B of terminal 55 is constituted of a single circular columnar member (not a hollow member but a solid member), and terminal 55 is constituted of only a member having an identical heat conductivity as a whole. In such a case, the heat generated during conduction between terminal 55 and counterpart terminal 45 is transported to the base portion 55A side, using only body portion 55B of terminal 55 as a medium, in such a configuration, the heat is less likely to be transferred from a heat generation point to base portion 55A than that in the fifth embodiment, and a heat dissipation effect acting on the heat generation point is also less than that in the fifth embodiment.

In contrast, in the fifth embodiment, heat transfer member 56 is provided to contact inner circumferential surface 55*n* of body portion 55B. Heat transfer member 56 is a member different from the member constituting cylindrical portion 55Ba of terminal 55, and heat transfer member 56 absorbs a portion of the heat generated at cylindrical portion 55Ba during conduction between terminal 55 and counterpart terminal 15 from cylindrical portion 55Ba, and transports the absorbed heat to the base portion 55A side. Since heat transfer member 56 is configured to satisfy the relation of Q1>Q2 when transporting the heat as described above, heat transfer member 56 can absorb the heat generated at cylindrical portion 55Ba of terminal 55 and efficiently transport the absorbed heat to base portion 55A, when compared with the case assumed as described above. Accordingly, an increase in the temperature of a heat generation point in terminal 55 can be effectively suppressed.

As has been described above, the technical idea disclosed in the first to fourth embodiments is not limited to be applied to the case where the inlet provided on the vehicle side corresponds toe "connector", and is also applicable to the case where the charging connector corresponds to a "connector".

[Variation for First to Fifth Embodiments]

The first to fifth embodiments described above have been described based on a connector used to establish electrical connection between a vehicle-mounted battery and a charger provided outside a vehicle. The technical idea of the present disclosure is not limited to be applied to such a configuration, and is also applicable to any configuration of transporting heat generated at a body portion of a terminal during conduction to a base portion side.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. A connector to be connected to a counterpart connector, comprising:
    a terminal including a base portion connected to an electric wire, and a cylindrical portion provided at a position opposite to the electric wire with respect to the base portion and extending away from the base portion, an outer circumferential surface of the cylindrical portion contacting a counterpart terminal of the counterpart connector when the connector is connected to the counterpart connector; and
    a heat transfer member which is provided to contact an inner circumferential surface of the cylindrical portion, absorbs a portion of heat generated at the cylindrical portion during conduction between the terminal and the counterpart terminal, from the cylindrical portion, and transports the absorbed heat to a base portion side,
    the heat transfer member being configured to satisfy Q1>Q2,
    where Q1 is defined as a heat transfer amount transported to the base portion side during the conduction, using the heat transfer member as a medium, and
    Q2 is defined as a heat transfer amount transported to the base portion side during the conduction, using another heat transfer member constituted of a member having a heat conductivity identical to that of the cylindrical portion as a medium, when the other heat transfer member is arranged to fill a space formed on an inner circumferential surface side of the cylindrical portion.

2. The connector according to claim 1, wherein
    both a part of the cylindrical portion located on the base portion side and a part of the cylindrical portion located opposite to the base portion side are closed, and an enclosed space is formed on the inner circumferential surface side of the cylindrical portion,
    the heat transfer member is a refrigerant sealed in the enclosed space, and
    the enclosed space and the refrigerant constitute a heat pipe.

3. The connector according to claim 2, wherein
    the refrigerant includes a gas-liquid two-phase refrigerant, and
    an evaporation portion where the refrigerant evaporates and a condensation portion where the refrigerant condenses are formed in the enclosed space, and the heat is transported according to a phase change of the refrigerant.

4. The connector according to claim 3, wherein a first flowing portion which allows the refrigerant to flow from the evaporation portion to the condensation portion, and a second flowing portion which allows the refrigerant to flow from the condensation portion to the evaporation portion without flowing through the first flowing portion are formed in the enclosed space.

5. The connector according to claim 1, wherein a part of the terminal constituting the cylindrical portion and a part of the terminal constituting the base portion are members separate from each other, and are integrated by being joined to each other.

6. The connector according to claim 1, further comprising a cooling device which cools the base portion by an air cooling method or a liquid cooling method.

* * * * *

UNITED STATES PATENT AND TRADEMARK OFFICE
CERTIFICATE OF CORRECTION

PATENT NO.         : 10,953,761 B2
APPLICATION NO.    : 16/405182
DATED              : March 23, 2021
INVENTOR(S)        : Kunihiko Arai It is certified that error appears in the above-identified patent and that said Letters Patent is hereby corrected as shown below:

In the Specification

In Column 3, Line(s) 23, after "vehicle", delete "f n" and insert --1 in--, therefor.

In Column 3, Line(s) 27, after "line", insert --III-III--.

In Column 11, Line(s) 27, delete "Beds" and insert --Body--, therefor.

In Column 13, Line(s) 29, after "55A", delete "," and insert --.--, therefor.

In Column 13, Line(s) 31, delete "Its" and insert --It is--, therefor.

In Column 13, Line(s) 65, delete "toe" and insert --to a--, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*